United States Patent
Park et al.

(10) Patent No.: US 8,953,243 B2
(45) Date of Patent: Feb. 10, 2015

(54) ANTI-REFLECTION STRUCTURE USING SURFACE PLASMON AND HIGH-K DIELECTRIC MATERIAL AND METHOD OF MANUFACTURING THE ANTI-REFLECTION STRUCTURE

(75) Inventors: Young-Jun Park, Suwon-si (KR); Jong-min Kim, Yongin-si (KR); Huamin Li, Suwon-si (KR); Won-Jong Yoo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 896 days.

(21) Appl. No.: 13/064,290

(22) Filed: Mar. 16, 2011

(65) Prior Publication Data

US 2011/0235184 A1 Sep. 29, 2011

(30) Foreign Application Priority Data

Mar. 25, 2010 (KR) .................. 10-2010-0026817

(51) Int. Cl.
*G02B 1/10* (2006.01)
*G02B 5/00* (2006.01)
*B82Y 30/00* (2011.01)
*G02B 1/11* (2006.01)

(52) U.S. Cl.
CPC .................. *G02B 5/008* (2013.01); *B82Y 30/00* (2013.01); *G02B 1/11* (2013.01)
USPC ......................................... 359/585; 359/580

(58) Field of Classification Search
None
See application file for complete search history.

(56) References Cited

U.S. PATENT DOCUMENTS

| 7,548,021 | B2 | 6/2009 | Cok et al. |
| 7,583,379 | B2* | 9/2009 | Zhao et al. .................... 356/301 |
| 2006/0034729 | A1* | 2/2006 | Poponin .................... 422/82.05 |
| 2007/0063628 | A1 | 3/2007 | Cok et al. |
| 2010/0085566 | A1* | 4/2010 | Cunningham ................ 356/301 |

FOREIGN PATENT DOCUMENTS

| JP | 2007214260 A | 8/2007 |
| KR | 102007005314 | 5/2007 |
| KR | 100750942 B | 8/2007 |
| KR | 1020090108237 | 10/2009 |
| KR | 1020090125012 | 12/2009 |
| WO | WO-2009072573 A1 | 6/2009 |

* cited by examiner

*Primary Examiner* — Arnel C Lavarias (57) ABSTRACT

An anti-reflection structure using surface plasmons and a high-k dielectric material, and a method of manufacturing the anti-reflection structure. The anti-reflection structure may include a high-k dielectric layer formed on a substrate, the high-k dielectric layer configured to allow incident light to pass therethrough, and a nano-material layer on the high-k dielectric layer. The high-k dielectric layer may include at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$).

12 Claims, 9 Drawing Sheets

ANTI-REFLECTION STRUCTURE USING SURFACE PLASMON AND HIGH-K DIELECTRIC MATERIAL AND METHOD OF MANUFACTURING THE ANTI-REFLECTION STRUCTURE

CROSS-REFERENCE TO RELATED APPLICATIONS

This application claims priority under U.S.C. §119 to Korean Patent Application No. 10-2010-0026817, filed on Mar. 25, 2010, in the Korean Intellectual Property Office (KIPO), the entire contents of which are incorporated herein by reference.

BACKGROUND

1. Field

Example embodiments relate to anti-reflection structures using a metal nanoparticle layer and a high-k dielectric material and methods of manufacturing the anti-reflection structures.

2. Description of the Related Art

Surface plasmons refer to plasmons resulting from strong interaction between free electrons, which are confined to a surface of a metal, and incident light. When a fine structure of a surface of an object is changed, the types of surface plasmons may be changed, and thus, wavelengths of light absorbed by a material may also be changed. Accordingly, colors of the material may be adjusted by using the surface plasmons.

Because light absorption by metal nanoparticles occurs when free electrons couple to light (electromagnetic field) in visible and near-infrared wavelength regions, colors may be selectively controlled. Accordingly, metal nanoparticles have recently been used in optical devices in order to utilize the surface plasmon effect.

SUMMARY

Provided are anti-reflection structures for reducing a reflectance by using surface plasmons and a high-k dielectric material and methods of manufacturing the anti-reflection structures. Additional aspects will be set forth in part in the description which follows and, in part, will be apparent from the description, or may be learned by practice of example embodiments.

According to example embodiments, an anti-reflection structure may include a high-k dielectric layer on a substrate, the high-k dielectric layer configured to allow incident light to pass therethrough; and a nano-material layer on the high-k dielectric layer.

The high-k dielectric layer may include at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$). The nano-material layer may be at least one of a nanoparticle layer including a plurality of nanoparticles, and a nanorod layer including a plurality of nanorods. The nano-material layer may be a metal thin film layer. The high-k dielectric layer may further include a dielectric layer on the nano-material layer.

The substrate may be at least one of an outer light-incident surface of an optical device, an inner light-incident surface of the optical device, and an inner light-emitting surface of the optical device.

According to example embodiments, a method of manufacturing an anti-reflection structure may include forming a high-k dielectric layer on a substrate, the high-k dielectric layer configured to allow incident light to pass therethrough; and forming a nano-material layer on the high-k dielectric layer.

The method may further include forming a dielectric layer on the nano-material layer. Forming the nano-material layer may include forming at least one of a nanoparticle layer including a plurality of nanoparticles and a nanorod layer including a plurality of nanorods. The nano-material layer may be a metal thin film layer. The high-k dielectric layer may include at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$).

Forming the nano-material layer on the high-k dielectric layer may include forming a metal thin film on the high-k dielectric layer; and forming nanoparticles by performing a heat treatment on the metal thin film. Forming the nano-material layer on the high-k dielectric layer may include coating a nano-structure including a plurality of nanoparticles on the high-k dielectric layer; and performing a heat treatment on the nano-structure.

DETAILED DESCRIPTION

An anti-reflection structure using surface plasmons and a high-k dielectric material and a method of manufacturing the anti-reflection structure according to example embodiments will be explained herein below in detail. Thicknesses of layers or regions illustrated in the drawings are exaggerated for clarity. Example embodiments may, however, be embodied in many different forms and should not be construed as being limited to example embodiments set forth herein; rather, these example embodiments are provided so that this disclosure will be thorough and complete, and will fully convey the concept of example embodiments to those of ordinary skill in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
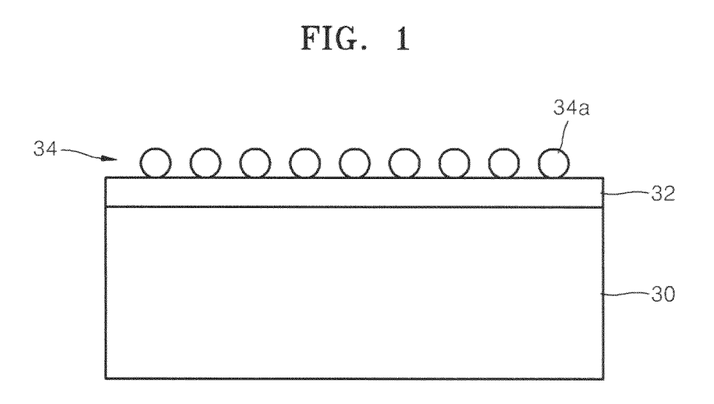
FIGS. 1 through 4 are cross-sectional views of anti-reflection structures according to example embodiments.

FIG. 1 is a cross-sectional view of an anti-reflection structure according to example embodiments. Referring to FIG. 1, a high-k dielectric layer 32 may be disposed on a substrate 30. The substrate 30 may be any optical device that operates based on light or use of the light during operation. For example, the substrate 30 may be a solar cell, an optical sensor, or a light-emitting diode (LED). A surface of the substrate 30 on which the high-k dielectric layer 32 is disposed may be an outer light-incident surface of an optical device, or an inner light-incident or light-emitting surface of the optical device. The high-k dielectric layer 32 may be formed of a material having a high-dielectric constant (high-k) and allowing incident light to pass therethrough, for example, at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$). The high-k dielectric layer 32 may have a thickness of, for example, about 1 nm to about 100 nm.

A nanoparticle layer 34 including a plurality of nanoparticles 34a may be disposed on the high-k dielectric layer 32. A surface of the high-k dielectric layer 32 on which the nanoparticle layer 34 is disposed may be a light-incident surface. The nanoparticles 34a may be metal nanoparticles, for example, gold (Au) nanoparticles. The high-k dielectric layer 32 and the nanoparticle layer 34 may constitute a first anti-reflection body.

Figure 2:
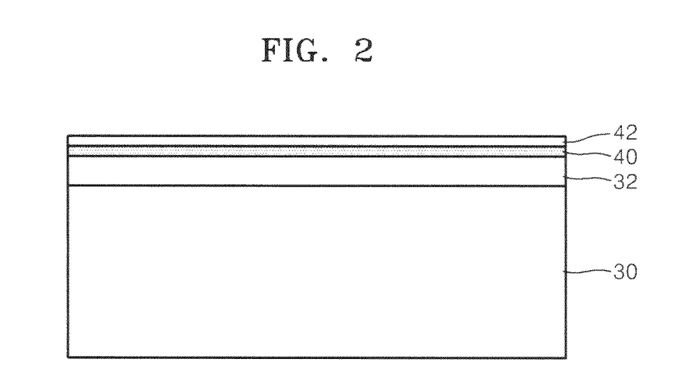

FIG. 2 is a cross-sectional view of an anti-reflection structure according to example embodiments. The following explanation will be made by focusing on a difference between the anti-reflection structure of FIG. 2 and the anti-reflection structure of FIG. 1.

Referring to FIG. 2, a metal nano-thin film 40 and a dielectric layer 42 may be sequentially stacked in the stated order on the high-k dielectric layer 32. The metal nano-thin film 40 may be formed of the same material as that of the nanoparticles 34a that are metal nanoparticles. The metal nano-thin film 40 may have a thickness of, for example, about 1 nm to about 100 nm. The dielectric layer 42 may be formed of a dielectric material that allows incident light to pass therethrough. For example, the dielectric layer 42 may be formed of $SiO_2$ or ZnO. The dielectric layer 42 may have a thickness of, for example, about 1 nm to about 50 nm. The high-k dielectric layer 32, the metal nano-thin film 40, and the dielectric layer 42 may constitute a second anti-reflection body.

Figure 3:
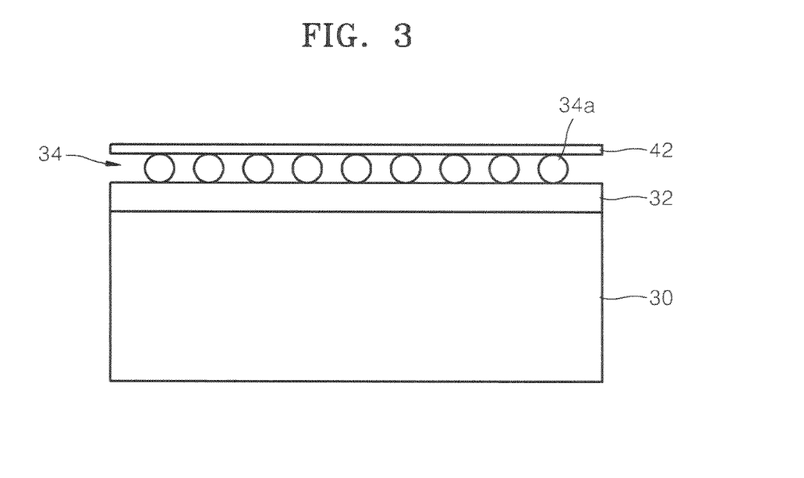

FIG. 3 is a cross-sectional view of an anti-reflection structure according to example embodiments. The anti-reflection structure of FIG. 3 is different from the anti-reflection structure of FIG. 1 in that the dielectric layer 42 may be disposed to cover the nanoparticle layer 34. In FIG. 3, the high-k dielectric layer 32, the nanoparticle layer 34, and the dielectric layer 42 may constitute a third anti-reflection body.

Figure 4:
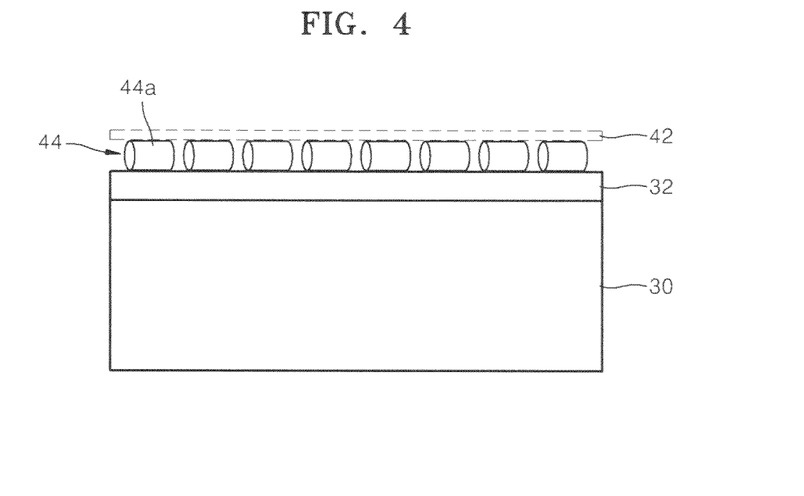

FIG. 4 is a cross-sectional view of an anti-reflection structure according to example embodiments. Referring to FIG. 4, a nanorod layer 44 may be disposed on the high-k dielectric layer 32. The nanorod layer 44, which is a metal nanorod layer, includes a plurality of metal nanorods 44a. The metal nanorods 44a may be formed of the same material as that of the nanoparticles 34a of FIG. 1. The metal nanorod layer 44 is covered by the dielectric layer 42. However, because the dielectric layer 42 is optional, the dielectric layer 42 may be omitted. Accordingly, the high-k dielectric layer 32 and the metal nanorod layer 44 may constitute a fourth anti-reflection body that may optically include the dielectric layer 42.

Figure 5:
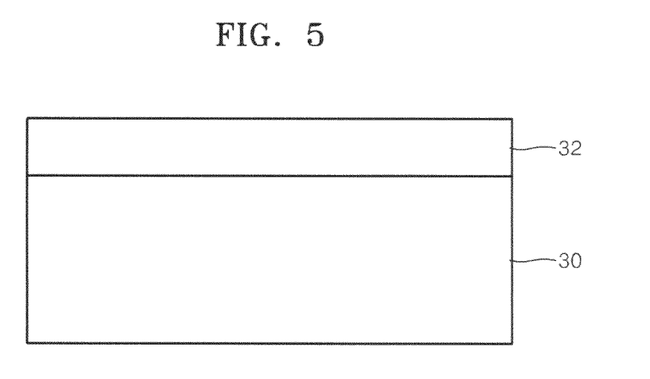
FIGS. 5 through 7 are cross-sectional views illustrating a method of manufacturing the anti-reflection structure of any of FIGS. 1 through 4, according to example embodiments.
Figure 6:
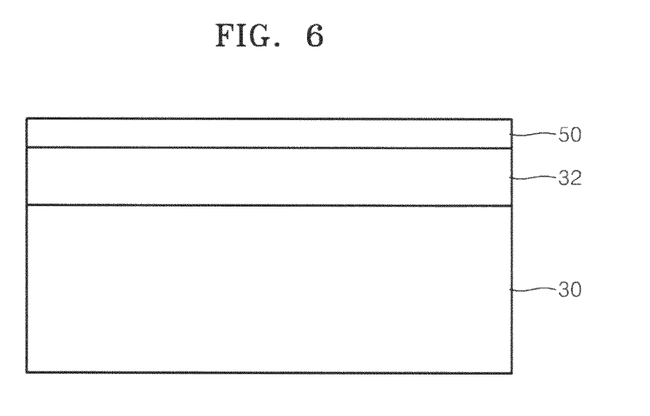
Figure 7:
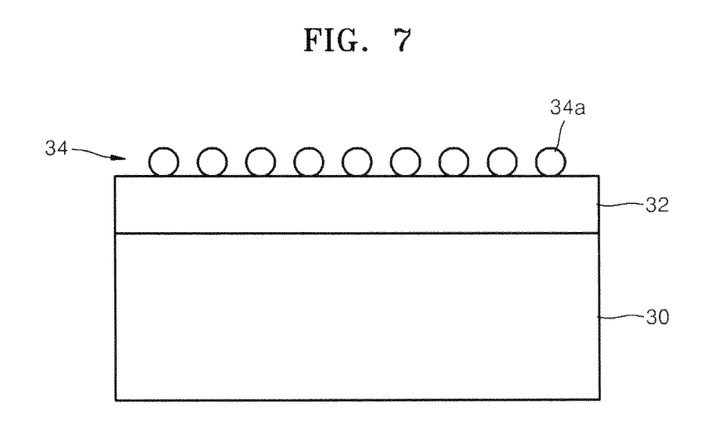

FIGS. 5 through 7 are cross-sectional views illustrating a method of manufacturing the anti-reflection structure of any of FIGS. 1 through 4, according to example embodiments. The same elements as those illustrated in FIGS. 1 through 4 are denoted by the same reference numerals and a detailed explanation thereof will not be given.

Referring to FIG. 5, the high-k dielectric layer 32 may be formed on the substrate 30. Referring to FIG. 6, a metal thin film 50 may be formed on the high-k dielectric layer 32. The metal thin film 50 for forming nanoparticles may be formed of the same material as that of the nanoparticles 34a of FIG. 1.

The metal thin film 50 may have a thickness of about 1 nm to about 100 nm. The metal thin film 50 may be formed by physical-chemical vapor deposition or thermal evaporation. Referring to FIG. 7, a heat treatment, e.g., thermal annealing, may be performed on the metal thin film 50, to form the nanoparticle layer 34 including the plurality of nanoparticles 34a on the high-k dielectric layer 32. The dielectric layer 42 of FIG. 3 may be further formed on the nanoparticle layer 34 (not shown).

The nanoparticle layer 34 may be formed by coating a nano-structure including a plurality of nanoparticles on the high-k dielectric layer 32 and performing an evaporation process. The nano-structure may be coated to a thickness of about 1 nm to about 100 nm.

Figure 8:
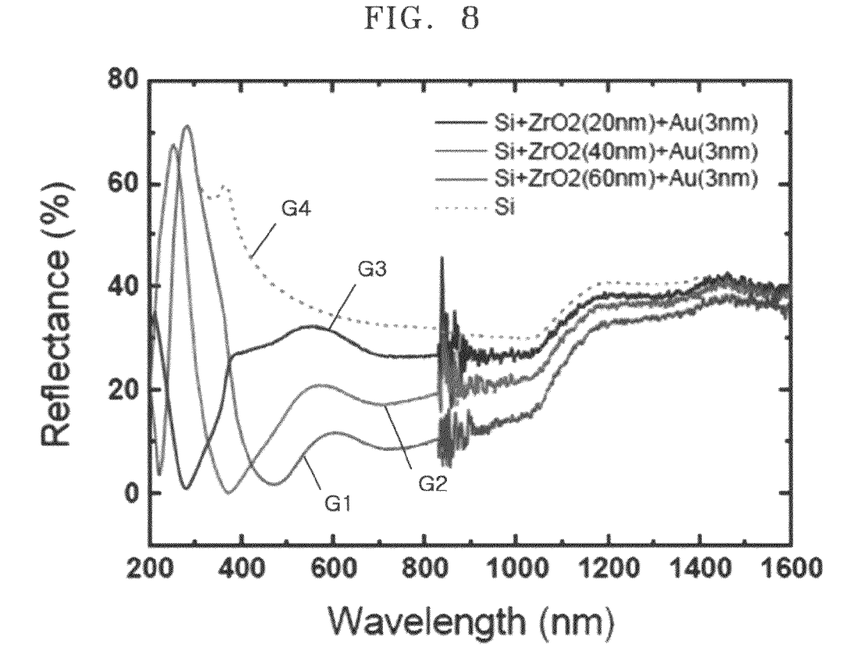
FIGS. 8 through 12 are graphs illustrating optical characteristics of the anti-reflection structure of any of FIGS. 1 through 4, according to example embodiments.
Figure 9:
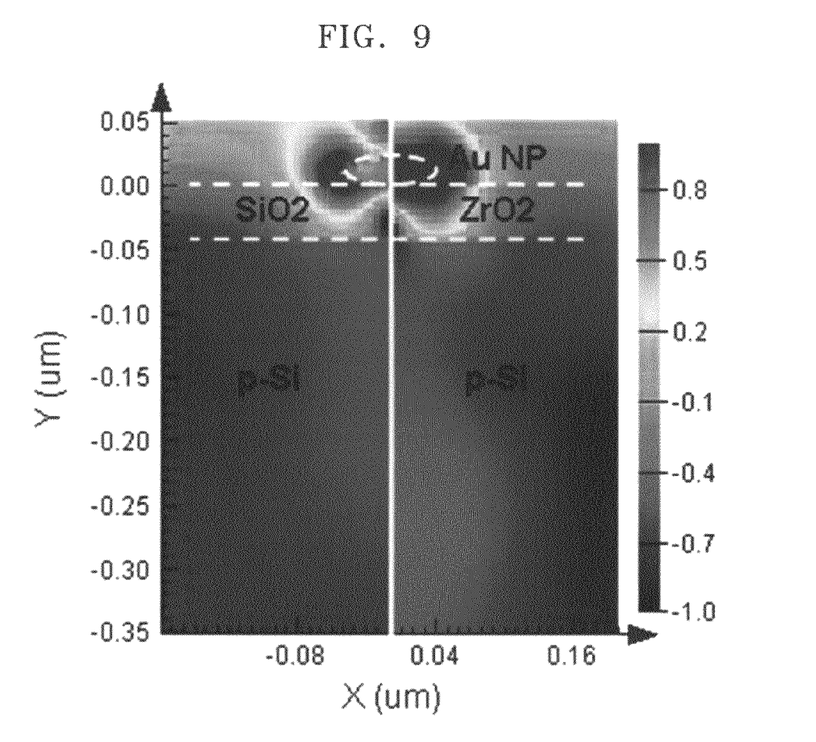
Figure 10:
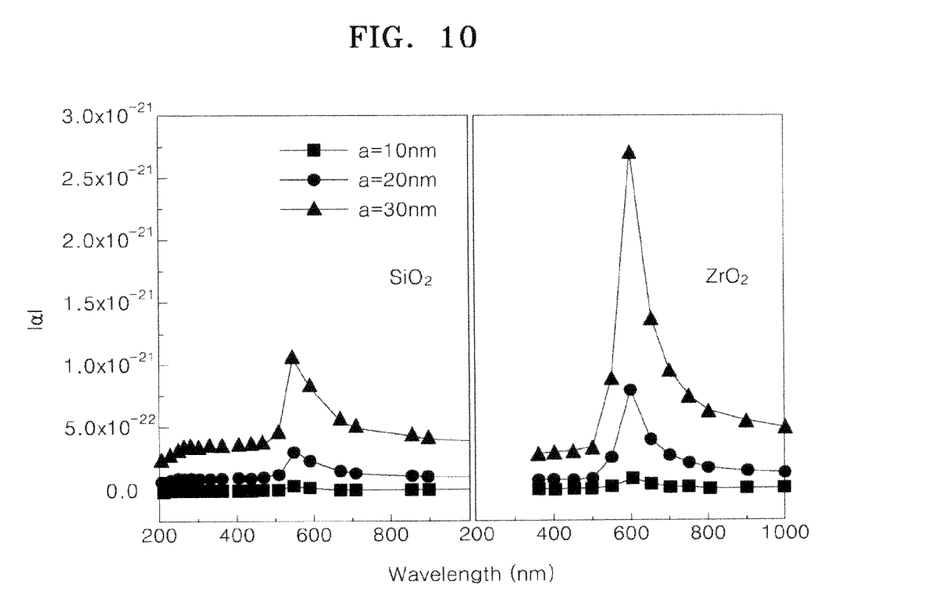

FIGS. 8 through 10 are graphs illustrating optical characteristics of the anti reflection structure of any of FIGS. 1 through 4, according to example embodiments. FIG. 8 illustrates a relationship between the reflectance of the anti-reflection structure and the wavelength of light incident on the anti-reflections structure.

In FIG. 8, first through third graphs G1 through G3 respectively show the reflectance of the anti-reflection structure when the high-k dielectric layer 32 has thicknesses of 60 nm, 40 nm, and 20 nm. The nanoparticles 34a are gold (Au) particles having a diameter of 3 nm. A fourth graph G4 illustrates a case where the high-k dielectric layer 32 is omitted.

Referring to FIG. 8, the reflectance varies according to the thickness of the high-k dielectric layer 32. That is, as the thickness of the high-k dielectric layer 32 increases, the reflectance decreases. Accordingly, a wavelength transmittance may be selectively controlled by adjusting the thickness of the high-k dielectric layer 32.

FIG. 9 illustrates the intensity of a transmitted electric field when the high-k dielectric layer 32 formed of $ZrO_2$ is used and when a layer formed of $SiO_2$ is used instead of the high-k dielectric layer 32.

Referring to FIG. 9, the intensity of the transmitted electric field when the high-k dielectric layer 32 formed of $ZrO_2$ is used may be higher than the intensity of the transmitted electric field when the layer formed $SiO_2$ is used instead of the high-k dielectric layer 32.

FIG. 10 illustrates polarizability when the high-k dielectric layer 32 formed of $ZrO_2$ is used and when a layer formed of $SiO_2$ is used instead of the high-k dielectric layer 32. In FIG. 10, ▲ indicates a case where each of the layer formed of $SiO_2$ and the high-k dielectric layer 32 formed of $ZrO_2$ has a thickness of 30 nm, • indicates a case where each of the layer formed of $SiO_2$ and the high-k dielectric layer 32 formed of $ZrO_2$ has a thickness of 20 nm, and ■ indicates a case where each of the layer formed of $SiO_2$ and the high-k dielectric layer 32 formed of $ZrO_2$ has a thickness of 10 nm.

Referring to FIG. 10, the polarizability when the high-k dielectric layer 32 formed of $ZrO_2$ is used may be higher than the polarizability when the layer formed of $SiO_2$ is used instead of the high-k dielectric layer 32.

Figure 11:
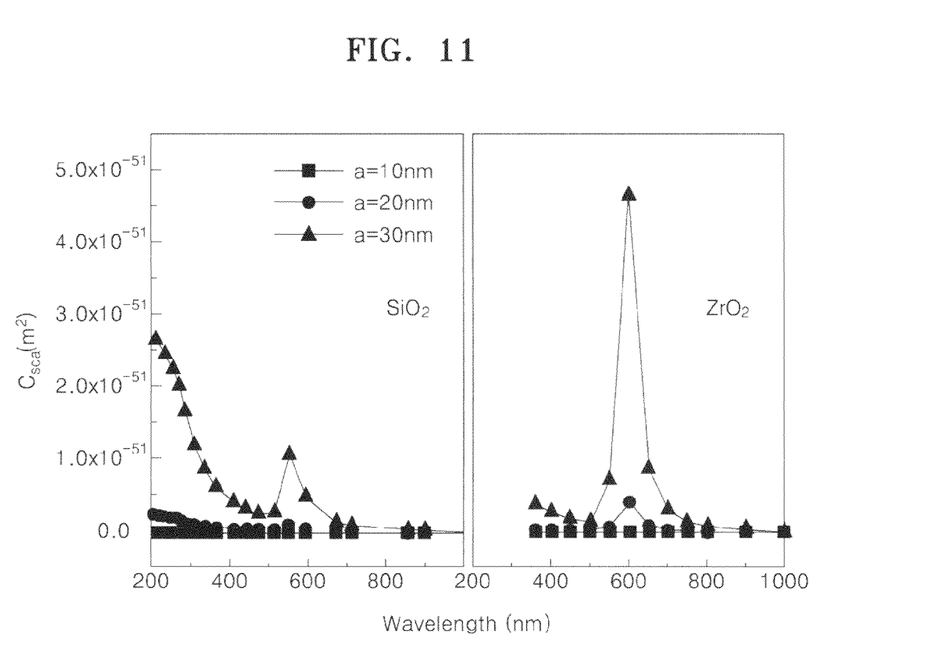

FIG. 11 illustrates scattering capability when the high-k dielectric layer 32 is formed of $ZrO_2$ and when a layer formed of $SiO_2$ is used instead of the high-k dielectric layer 32. In FIG. 11, ▲ indicates a case where each of the layer formed of $SiO_2$ and the high-k dielectric layer 32 formed of $ZrO_2$ has a thickness of 30 nm, • indicates a case where each of the layer formed of $SiO_2$ and the high-k dielectric layer 32 formed of $ZrO_2$ has a thickness of 20 nm, and ■ indicates a case where each of the layer formed of $SiO_2$ and the high-k dielectric layer 32 formed of $ZrO_2$ has a thickness of 10 nm.

Referring to FIG. 11, the scattering capability when the high-k dielectric layer 32 formed of $ZrO_2$ is used may be higher than the scattering capability when the layer formed of $SiO_2$ is used instead of the high-k dielectric layer 32.

Figure 12:
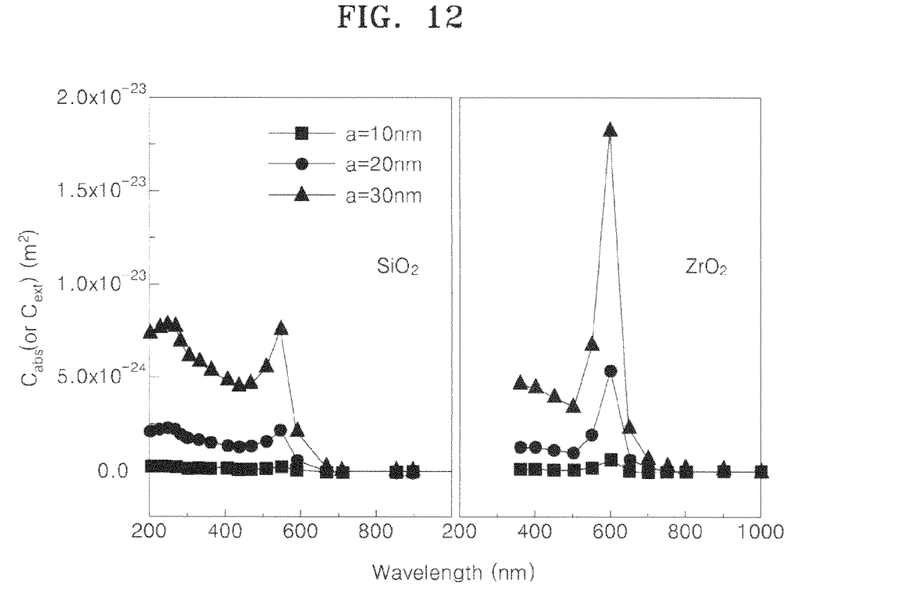

FIG. 12 illustrates light absorption when the high-k dielectric layer 32 formed of $ZrO_2$ is used and when a layer formed of $SiO_2$ is used instead of the high-k dielectric layer 32. In FIG. 12, ▲ indicates a case where each of the layer formed of $SiO_2$ and the high-k dielectric layer 32 formed of $ZrO_2$ has a thickness of 30 nm, • indicates a case where each of the layer formed of $SiO_2$ and the high-k dielectric layer 32 formed of $ZrO_2$ has a thickness of 20 nm, and ■ indicates a case where each of the layer formed of $SiO_2$ and the high-k dielectric layer 32 formed of $ZrO_2$ has a thickness of 10 nm.

Referring to FIG. 12, the light absorption when the high-k dielectric layer 32 formed of $ZrO_2$ is used may be higher than the light absorption when the layer formed of $SiO_2$ is used instead of the high-k dielectric layer 32.

As described above, according to example embodiments, the anti-reflection structure may reduce a reflectance due to a surface plasmon effect. Accordingly, if the anti-reflection structure is applied to an optical device, light use efficiency of the optical device may be improved. For example, if the anti-reflection structure is applied to a solar cell, light use efficiency of the solar cell may be improved. Furthermore, if the anti-reflection structure is applied to a display device based on light, e.g., a light-emitting diode (LED), a light transmittance may be increased. Moreover, a transmittance may be selectively controlled according to light wavelengths by adjusting the thickness of a high-k dielectric material of the anti-reflection structure.

It should be understood that example embodiments described therein should be considered in a descriptive sense only and not for purposes of limitation. Descriptions of features or aspects within each example embodiment should typically be considered as available for other similar features or aspects in other example embodiments.

What is claimed is:

1. An anti-reflection structure comprising:
   a high-k dielectric layer on a substrate, the high-k dielectric layer configured to allow incident light to pass therethrough;
   a nano-material layer on the high-k dielectric layer such that a lower surface of the nano-material layer is in contact with the high-k dielectric layer, the nano-material layer being a nanoparticle layer including a plurality of nanoparticle; and
   a dielectric layer on an upper surface of the nano-material layer.

2. The anti-reflection structure of claim 1, wherein the high-k dielectric layer comprises at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$).

3. The anti-reflection structure of claim 1, wherein the substrate is at least one of an outer light-incident surface of an optical device, an inner light-incident surface of the optical device, and an inner light-emitting surface of the optical device.

4. An anti-reflection structure comprising:
   a high-k dielectric layer on a substrate, the high-k dielectric layer configured to allow incident light to pass therethrough;
   a nano-material layer on the high-k dielectric layer such that a lower surface of the nano-material layer is in contact with the high-k dielectric layer, the nano-material layer being a metal thin film layer; and
   a dielectric layer on an upper surface of the nano-material layer.

5. The anti-reflection structure of claim 4, wherein the high-k dielectric layer comprises:
at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$).

6. The anti-reflection structure of claim 4, wherein the substrate is at least one of an outer light-incident surface of an optical device, an inner light-incident surface of the optical device, and an inner light-emitting surface of the optical device.

7. A method of manufacturing an anti-reflection structure, the method comprising:
forming a high-k dielectric layer on a substrate, the high-k dielectric layer configured to allow incident light to pass therethrough;
forming a nano-material layer on the high-k dielectric layer such that a lower surface of the nano-material layer directly contacts the high-k dielectric layer, the nano-material layer being a metal thin film;
forming a dielectric layer on an upper surface of the nano-material layer.

8. The method of claim 7, wherein the high-k dielectric layer comprises at least one of zirconium oxide ($ZrO_2$), hafnium oxide ($HfO_2$), titanium oxide ($TiO_2$), tantalum oxide ($Ta_2O_5$), lanthanum oxide ($La_2O_3$), yttrium oxide ($Y_2O_3$) and aluminum oxide ($Al_2O_3$).

9. The method of claim 7, wherein forming the nano-material layer on the high-k dielectric layer comprises:
forming a metal thin film on the high-k dielectric layer; and
forming nanoparticles by performing a heat treatment on the metal thin film.

10. The method of claim 7, wherein forming the nano-material layer on the high-k dielectric layer comprises:
coating a nano-structure including a plurality of nanoparticles on the high-k dielectric layer; and
performing a heat treatment on the nano-structure.

11. The method of claim 7, wherein the nano-material layer formed directly on the high-k dielectric layer does not contain silicondioxide ($SiO_2$).

12. An anti-reflection structure comprising:
a high-k dielectric layer on a substrate, the high-k dielectric layer configured to allow incident light to pass therethrough;
a nano-material layer on the high-k dielectric layer such that such that a lower surface of the nano-material layer is in contact with the high-k dielectric layer with no silicondioxide ($SiO_2$) therebetween; and
a dielectric layer on an upper surface of the nano-material layer.

* * * * *